(12) United States Patent
Educate et al.

(10) Patent No.: US 8,065,999 B2
(45) Date of Patent: Nov. 29, 2011

(54) ADJUSTABLE COOKING GRATE FOR BARBEQUE GRILLS

(75) Inventors: David Educate, Mequon, WI (US); Ladon Hopkins, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 558 days.

(21) Appl. No.: 12/172,682

(22) Filed: Jul. 14, 2008

(65) Prior Publication Data

US 2010/0006083 A1 Jan. 14, 2010

(51) Int. Cl.
*F23H 13/04* (2006.01)
(52) U.S. Cl. ............... 126/153; 126/152 R; 126/152 B
(58) Field of Classification Search ............ 126/152 R, 126/152 B, 153
See application file for complete search history.

(56) References Cited

U.S. PATENT DOCUMENTS

| | | | | |
|---|---|---|---|---|
| 1,263,863 A * | 4/1918 | Crosby | ............... | 99/449 |
| 3,120,883 A * | 2/1964 | Greilling | ............... | 52/473 |
| 3,330,204 A * | 7/1967 | Little | ............... | 99/339 |
| 4,178,844 A | 12/1979 | Ward et al. | | |
| 4,553,523 A | 11/1985 | Stohrer, Jr. | | |
| 4,561,419 A | 12/1985 | Kozoil | | |
| 4,611,573 A * | 9/1986 | Newman | ............... | 126/153 |
| 4,671,012 A * | 6/1987 | Merklinger et al. | ............... | 49/55 |
| D291,646 S * | 9/1987 | Koziol | ............... | D7/409 |
| 4,817,334 A * | 4/1989 | Badger et al. | ............... | 49/55 |
| 4,899,724 A | 2/1990 | Kuechler | | |
| 5,271,195 A * | 12/1993 | Wahe | ............... | 52/107 |
| 5,295,596 A * | 3/1994 | Squitieri | ............... | 211/175 |
| 5,355,868 A | 10/1994 | Haen | | |
| 5,437,221 A * | 8/1995 | Schwod | ............... | 99/449 |
| 5,572,924 A * | 11/1996 | Crnjanski | ............... | 99/426 |
| 5,586,666 A * | 12/1996 | Squitieri | ............... | 211/175 |
| 6,076,692 A * | 6/2000 | Avot | ............... | 220/8 |
| 6,123,208 A * | 9/2000 | Haenszel | ............... | 211/175 |
| 6,189,527 B1 | 2/2001 | Walsh et al. | | |
| 6,279,467 B1 * | 8/2001 | Tiemann | ............... | 99/426 |
| 6,279,566 B1 | 8/2001 | Craven, Jr. | | |
| 6,332,548 B1 * | 12/2001 | West et al. | ............... | 211/175 |
| 6,457,594 B1 * | 10/2002 | Tiemann | ............... | 211/181.1 |
| 6,640,799 B2 | 11/2003 | Kahler et al. | | |
| 6,681,759 B2 | 1/2004 | Bentulan | | |
| 6,834,768 B2 * | 12/2004 | Jersey et al. | ............... | 211/189 |
| 7,182,210 B2 * | 2/2007 | Metcalf | ............... | 211/175 |
| 7,225,936 B2 * | 6/2007 | Jersey et al. | ............... | 211/189 |
| 7,246,711 B1 * | 7/2007 | Metcalf | ............... | 211/175 |
| 7,426,928 B2 * | 9/2008 | Sanders et al. | ............... | 126/30 |
| 7,571,822 B2 * | 8/2009 | Metcalf | ............... | 211/175 |
| 2002/0112717 A1* | 8/2002 | Bentulan | ............... | 126/25 R |
| 2002/0179082 A1* | 12/2002 | Kahler et al. | ............... | 126/41 R |
| 2006/0102163 A1* | 5/2006 | Sanders et al. | ............... | 126/30 |

(Continued)

*Primary Examiner* — Kenneth Rinehart
*Assistant Examiner* — Jorge Pereiro
(74) *Attorney, Agent, or Firm* — Fellers, Snider, Blankenship, Bailey & Tippens, P.C.

(57) ABSTRACT

An adjustable grate is described herein that may be easily adjusted to fit within variously sized grills. The adjustable grate includes a main plate having a plurality of fingers extending from a front side and a rear side. A front slide plate has a plurality of fingers that slidably engage with the fingers on the front side of the main plate. A rear slide plate has a plurality of fingers that slidably engage with the fingers on the rear side of the main plate. The front slide plate, the rear slide plate and the main plate define a cooking surface. The front slide plate and the rear slide plate may be slidably adjusted with respect to the main plate to expand or contract the cooking surface.

7 Claims, 4 Drawing Sheets

U.S. PATENT DOCUMENTS

2006/0272630 A1* 12/2006 Sanders et al. ................ 126/9 R
2007/0138116 A1* 6/2007 Metcalf ..................... 211/90.01
2007/0278171 A1* 12/2007 Jersey et al. .................. 211/188
2011/0061543 A1* 3/2011 Ingrassia et al. ................ 99/340

* cited by examiner

ADJUSTABLE COOKING GRATE FOR BARBEQUE GRILLS

FIELD OF THE INVENTION

The invention relates to an adjustable grate for use with an outdoor grill. More particularly, the invention relates to an adjustable grate having three pieces slidably engaged with one another to permit ease of adjustment as necessary to fit within existing grills.

BACKGROUND OF THE INVENTION

Gas-fired barbecue grills have experienced a tremendous growth in popularity since their introduction. Most gas-fired barbeque grills have a rectangular box-like structure with a hinged lid and a burner mounted in the bottom of the grill casting. The burner is connected to a gas supply line and is used to supply convective heat for cooking food as well as to heat lava rock, metal plates of various configuration, or wood product briquettes to supply some radiant heat and provide hot surfaces for grease vaporization. A grate is located above the rock or briquettes to provide a surface to support the food while it is being cooked.

The grill castings are normally made of aluminum or steel and are quite durable. The grate, however, may have a much shorter service life than the casting itself. In order for such replacement grates to fit diverse types and models of grills, a replacement model must be adjustable to fit properly within a selected grill.

SUMMARY OF THE INVENTION

An adjustable grate is described herein that may be easily adjusted to fit within variously sized grills. The adjustable grate of the invention includes a main plate. A front slide plate is slidably engaged with a front side of the main plate. A rear slide plate is slidably engaged with the rear side of the main plate. A plurality of fingers extends from the front side and from the rear side of the central section of the main plate. A plurality of fingers extends from the front slide plate and from the rear slide plate for slidably engaging the plurality of fingers extending from the front and rear side of the central section. The front side plate, the rear side plate and the main plate define a cooking surface.

The front slide plate and the rear slide plate may be slidably adjusted with respect to the main plate to expand or contract the cooking surface. The front slide plate and rear slide plates have ends adapted for supporting the central section on a ledge of a grill.

In a preferred embodiment, a left finger and a right finger of the front slide plate and of the rear slide plate are each provided with an inwardly projecting guide that engages longitudinal recesses formed on left and right fingers that extend from a front and rear side of the central member. The inwardly projecting guides provide vertical support to the distal ends of the exterior fingers of the slide plates and slide within the recesses of the pair of exterior fingers of the main plate.

DETAILED DESCRIPTION OF THE PREFERRED EMBODIMENTS

Figure 1:
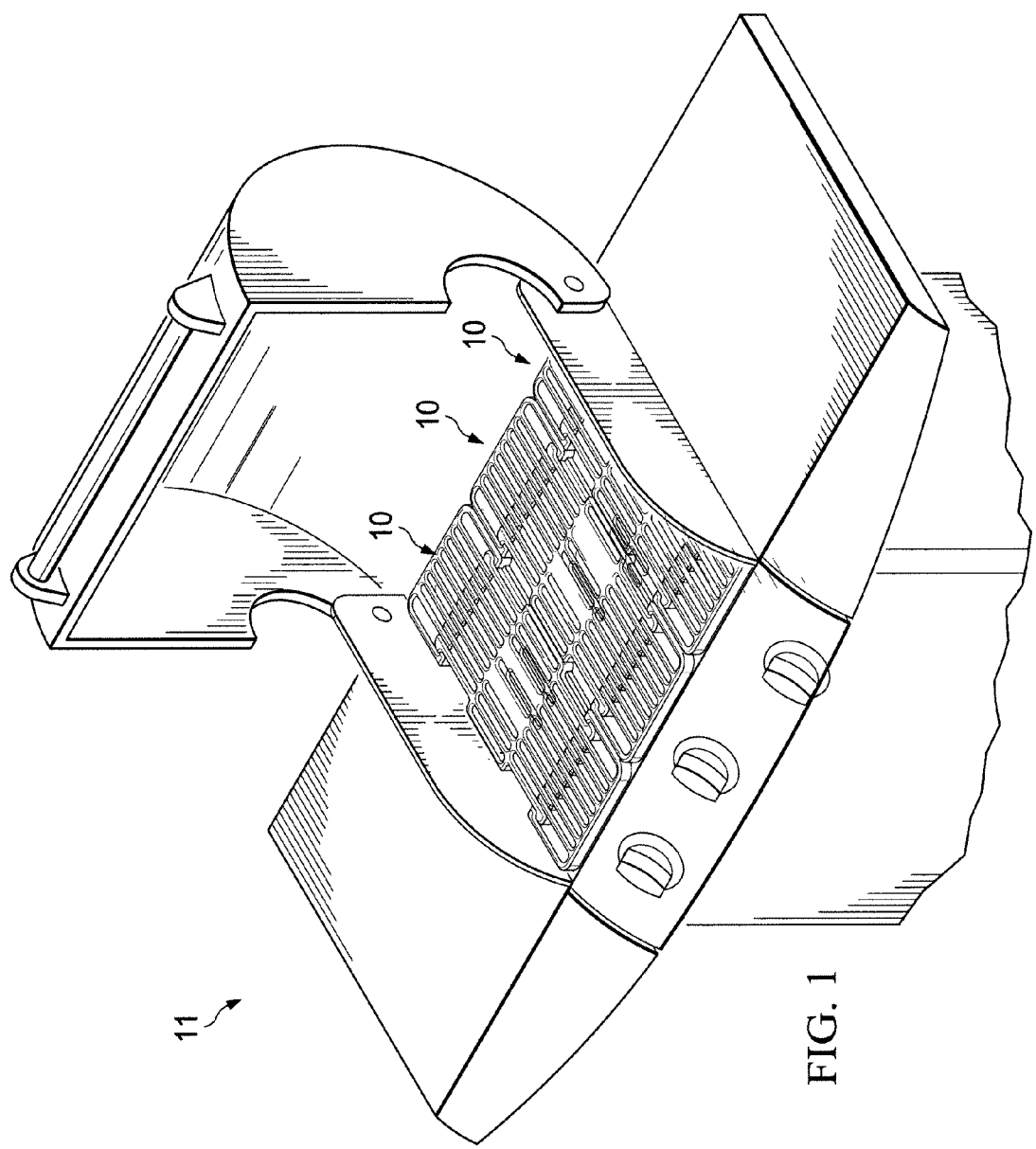
FIG. 1 is a perspective view of three adjustable sliding grate assemblies of the invention shown installed within a grill.

Referring first to FIG. 1, shown are three adjustable grates 10 located within a typical grill 11. As can be seen from the figure, each adjustable grate 10 is expanded to fill the grill without leaving any gaps. Adjustable grate 10 may be constructed of various materials including cast iron, cast aluminum, cast stainless steel, or other castable material. Alternatively, grate 10 may be made by machining a block of material.

Figure 2:
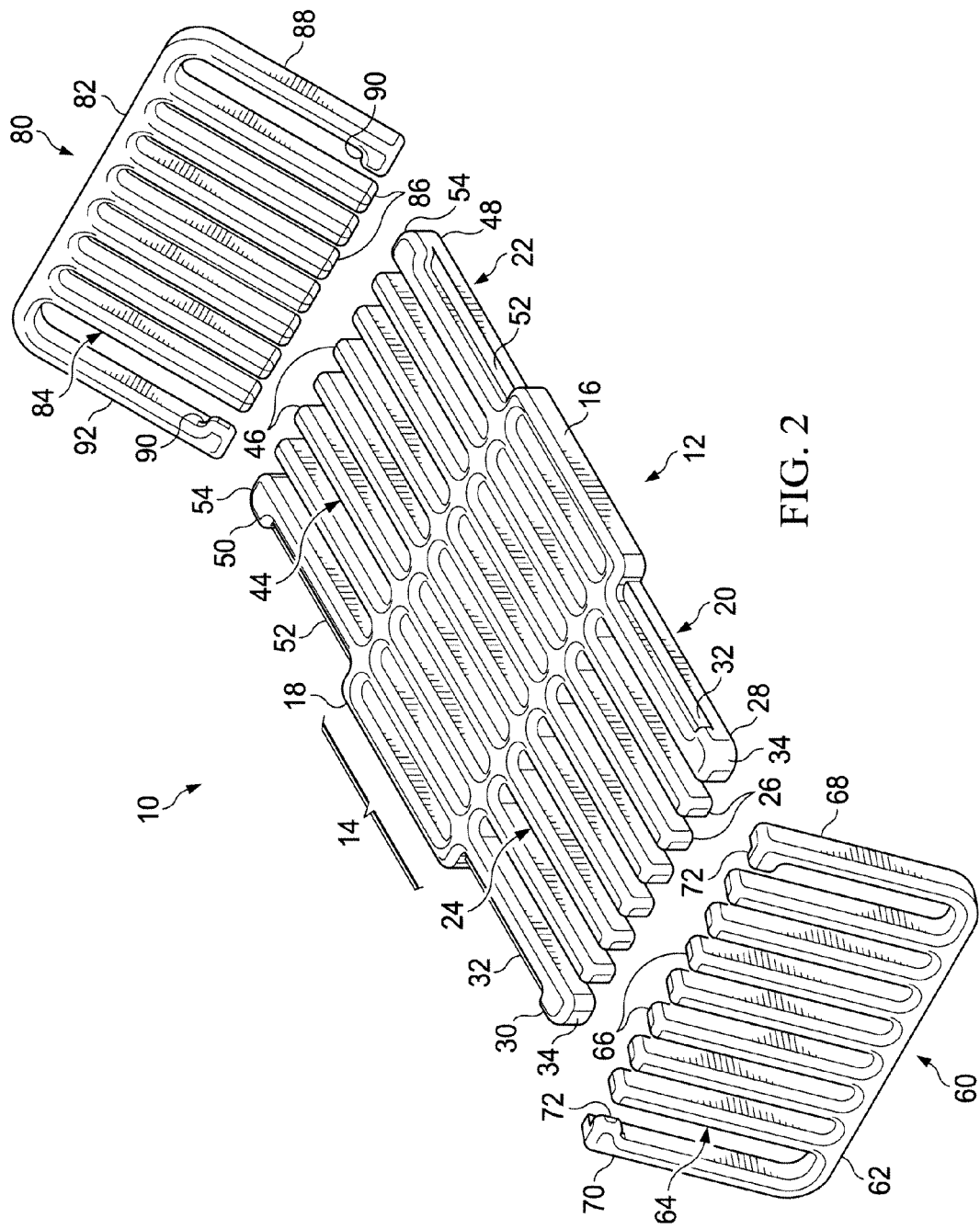
FIG. 2 is a perspective view of one adjustable sliding grate assembly of FIG. 1 shown disassembled.
Figure 3:
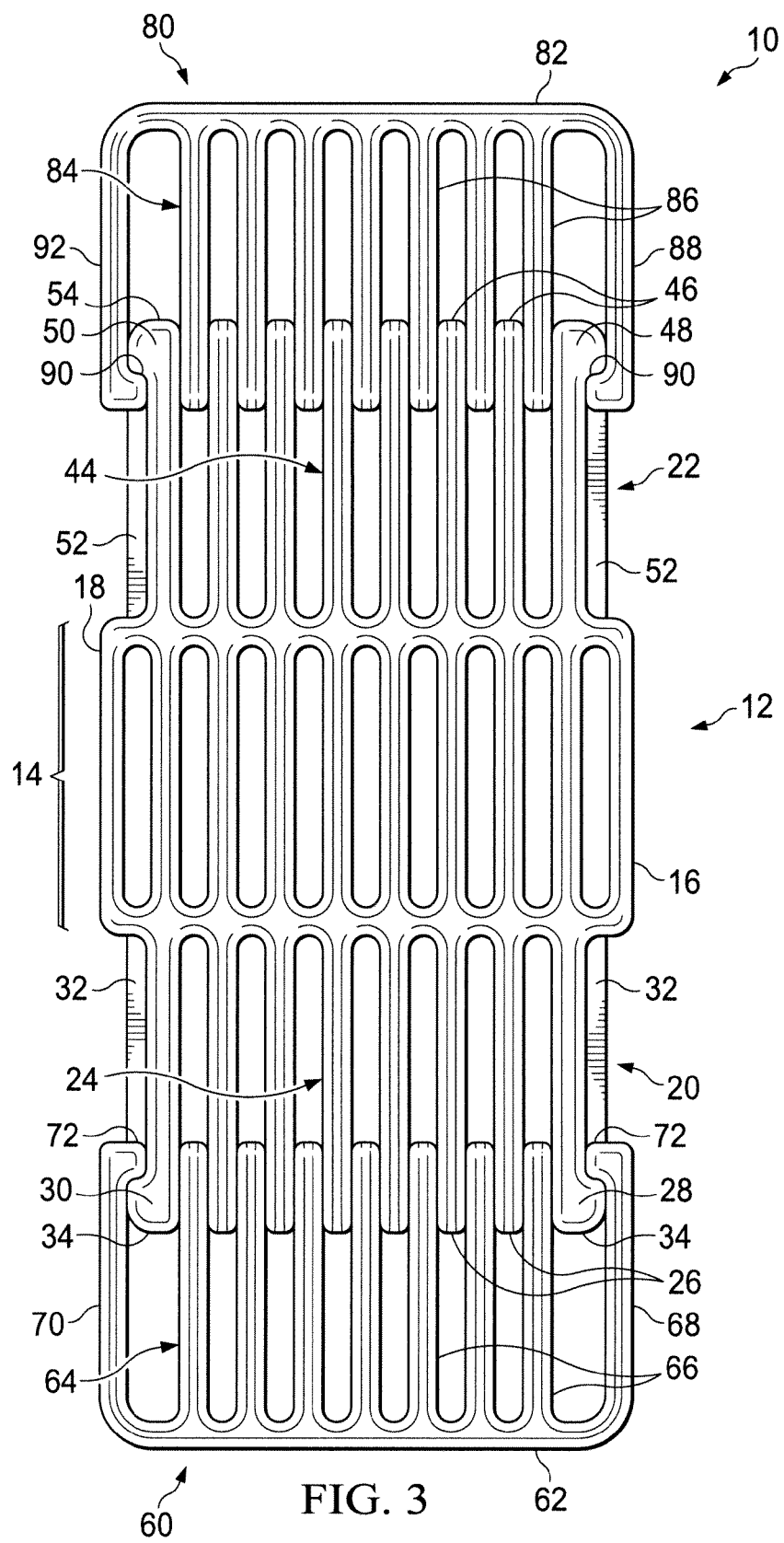
FIG. 3 is a top view of one adjustable sliding grate assembly of FIG. 1, shown in an assembled expanded or open configuration.
Figure 4:
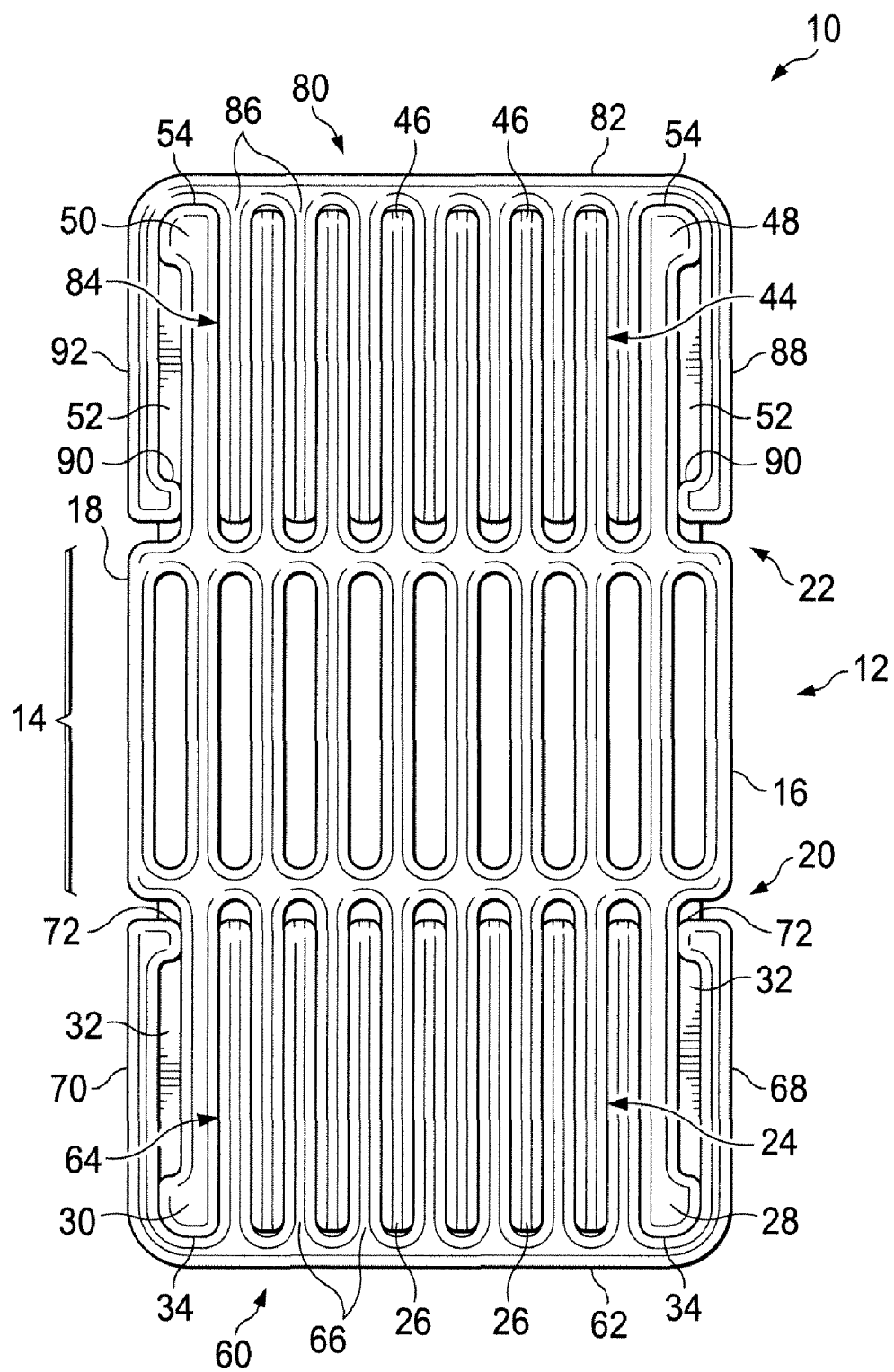
FIG. 4 is a top view of one adjustable sliding grate assembly of FIG. 1, shown in an assembled compact or closed configuration.

Referring now to FIGS. 2 through 4, adjustable grate 10 of the invention includes a main plate 12. Main plate 12 has a central section 14 having a right side 16, a left side 18, a front side 20, and a rear side 22. Central section 14 defines a plurality of apertures in central section 14. A plurality of fingers 24 extend outwardly away from front side 20 of central section 14. Plurality of fingers 24 includes a plurality of interior fingers 26 and a pair of exterior fingers, including right finger 28 and left finger 30. Exterior fingers 28, 30 each define a recess 32 on an upper outside edge portion of a length of exterior fingers 28, 30. Recesses 32 have an end portion 34 at an outer end of exterior fingers 28, 30.

A plurality of fingers 44 extend away from rear side 22 of central section 14. Plurality of fingers 44 includes a plurality of interior fingers 46 and a pair of exterior fingers including right finger 48 and left finger 50. Exterior fingers 48, 50 each define a recess 52 on an upper outside edge for a portion of a length of exterior fingers 48, 50. Recesses 52 have an outer end defined by an end portion 54 of exterior fingers 48, 50.

A front side plate 60 is slidably engaged with a plurality of fingers 64 extending from front side 20 of central section 14. Front slide plate 60 defines an outer border member 62 that has a plurality of fingers 64 extending therefrom. Plurality of fingers 64 includes a plurality of interior fingers 66 and a pair of exterior fingers including right finger 68 and left finger 70. Right finger 68 is provided with an inwardly projecting guide 72. Left finger 70 is also provided with inwardly projecting guides 72. Inwardly projecting guides 72 are proximate distal ends of right finger 68 and left finger 70. The plurality of interior fingers 66 of front side plate 60 are spaced to be received between the plurality of fingers 24 extending from front side 20 of central section 14.

The inwardly projecting guides 72 of front slide plate 60 are received within recesses 32 of exterior fingers 28, 30 of main plate 12. Inwardly projecting guides 72 provide vertical support to distal ends of exterior fingers 28, 30 of front slide plate 60. Inwardly projecting guides 72 additionally slide within recesses 32 of the pair of exterior fingers 28, 30 of main plate 12. The end portion 34 of exterior fingers 28, 30 of main plate 12 defines a stop that limits extension of front slide plate 60 with respect to main plate 12.

A rear slide plate 80 slidably engages with plurality of fingers 44 that extend from rear side 22 of central section 14. Rear slide plate 80 defines an outer border member 82 that has a plurality of fingers 84 extending therefrom. Plurality of fingers 84 include a plurality of interior fingers 86 and a pair of exterior fingers, including right finger 88 and left finger 92. Right finger 88 has an inwardly projecting guide 90 and left finger 92 also has an inwardly projecting guide 90. Inwardly projecting guides 90 are proximate distal ends of right finger 88 and left finger 92. The plurality of interior fingers 86 of rear slide plate 80 are spaced to be received between the plurality of fingers 44 extending from rear side 22 of central section 14, wherein the inwardly projecting guides 90 of rear slide plate 80 are received within recesses 52 on the pair of exterior fingers 48, 50 of main plate 12. Inwardly projecting guides 90 provide vertical support to distal ends of exterior fingers 88, 92 of rear slide plate 80 for sliding within recesses 52 of pair of exterior fingers 48, 50 of main plate 12. End portion 54 of exterior fingers 48, 50 of main plate 12 define a stop that limits extension of rear slide plate 80 with respect to main plate 12.

Outer border member 62 of front slide plate 60 and outer border member 82 of rear slide plate 80 may engage a shelf on a grill for supporting a cooking surface. Front slide plate 60 and rear slide plate 80 are slidably received on front side 20 and rear side 22. Slide plates 60 and 80 may be positioned in a fully expanded configuration (FIG. 3), e.g., 20", or in a fully retracted configuration (FIG. 4), e.g., 14.25", or in any position therebetween to accommodate grills of various sizes. Inwardly projecting guides 72 of front slide plate 60 are received in recesses 32 of exterior fingers 28 and 30 to limit the maximum distance that front slide plate 60 may be extended. Similarly, inwardly projecting guides 90 of rear slide plate 80 are received in recesses 52 of exterior fingers 48 and 50 to limit the maximum distance that rear slide plate 80 may be extended. An adjustable sliding grate assembly constructed in accordance with the invention provides an attractive and durable grate for use in gas grills of various sizes.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method of adjusting an adjustable grate to fit within a grill body comprising the steps of:
    slidably engaging a front slide plate on a front side of a main plate;
    slidably engaging a rear slide plate on a rear side of said main plate;
    resting said front slide plate on a shelf defined by the grill body; and
    resting said rear slide plate on a shelf defined by a grill body;
    locating inwardly projecting guides that bulge inwardly proximate distal ends of fingers of said front slide plate and said rear slide plate within recesses formed on fingers extending from a front and rear side of said main plate for providing vertical support to said distal ends of said fingers of said slide plates and for sliding within said recesses of said fingers of said main plate.

2. A grill comprising:
    a grill body defining a ledge;
    an adjustable grate sized to rest on said ledge, said adjustable grate comprising:
        a main plate;
        a front slide plate slidably engaged with said main plate on a front side of said main plate;
        a rear slide plate slidably engaged with said main plate on a rear side of said main plate;
        wherein said front slide plate, said rear slide plate and said main plate define a cooking surface; and
        wherein said front slide plate and said rear slide plate may be slidably adjusted to with respect to said main plate to expand or contract said cooking surface;
    said main plate defines a central section; and further comprising:
        a plurality of fingers extending from a front side of said central section;
        a plurality of fingers extending from a rear side of said central section;
        a plurality of fingers extending from said front slide plate for slidably engaging said plurality of fingers extending from said front side of said central section; and
        a plurality of fingers extending from said rear slide plate for slidably engaging said plurality of fingers extending from said rear side of said central section; and
    further wherein:
    said plurality of fingers extending from said front slide plate comprise exterior fingers comprised of a right finger and a left finger;
    said plurality of fingers extending from said rear slide plate comprise exterior fingers comprised of a right finger and a left finger;
    wherein one of said right finger and said left finger of said front slide plate has an inwardly projecting guide that bulges inwardly proximate distal ends of said right finger and said left finger;
    wherein one of said right finger and said left finger of said rear slide plate has an inwardly projecting guide that bulges inwardly proximate distal ends of said right finger and said left finger;
    wherein said plurality of fingers extending from said front side of said central section comprise exterior fingers comprised of a left finger and a right finger wherein one of said left finger and said right finger has a longitudinal recess;
    wherein said plurality of fingers extending from said rear side of said central section comprise exterior fingers comprised of a right finger and a left finger wherein one of said right finger and said left finger has a longitudinal recess;
    wherein said inwardly projecting guides are received within said recesses of said pair of exterior fingers of said main plate, said inwardly projecting guides for providing vertical support to distal ends of said exterior fingers of said slide plates and for sliding within said recesses of said pair of exterior fingers of said main plate.

3. The grill according to claim 2 wherein said end portion of said exterior fingers extending on said front side of said main plate define a stop that defines a limit for extension of said front slide plate with respect to said main plate.

4. The grill according to claim 2 wherein said end portion of said exterior fingers extending on said rear side of said main plate define a stop that defines a limit for extension of said rear slide plate with respect to said main plate.

5. An adjustable grate comprising:
    a main plate;
    a front slide plate slidably engaged with said main plate on a front side of said main plate;
    a rear slide plate slidably engaged with said main plate on a rear side of said main plate;
    wherein said front slide plate, said rear slide plate and said main plate define a cooking surface; and
    wherein said front slide plate and said rear slide plate may be slidably adjusted with respect to said main plate to expand or contract said cooking surface;

wherein said main plate defines a central section; and further comprising:
- a plurality of fingers extending from a front side of said central section;
- a plurality of fingers extending from a rear side of said central section;
- a plurality of fingers extending from said front slide plate for slidably engaging said plurality of fingers extending from said front side of said central section; and
- a plurality of fingers extending from said rear slide plate for slidably engaging said plurality of fingers extending from said rear side of said central section; and further wherein:
said plurality of fingers extending from said front slide plate comprise exterior fingers comprised of a right finger and a left finger;
said plurality of fingers extending from said rear slide plate comprise exterior fingers comprised of a right finger and a left finger;
wherein one of said right finger and said left finger of said front slide plate has an inwardly projecting guide that bulges inwardly proximate distal ends of said right finger and said left finger;
wherein one of said right finger and said left finger of said rear slide plate has an inwardly projecting guide that bulges inwardly proximate distal ends of said right finger and said left finger;
wherein said plurality of fingers extending from said rear side of said central section comprise exterior fingers comprised of a right finger and a left finger wherein one of said right finger and said left finger has a longitudinal recess;
wherein said plurality of fingers extending from said front side of said central section comprise exterior fingers comprised of a right finger and a left finger wherein one of said right finger and said left finger has a longitudinal recess; and
wherein said inwardly projecting guides are received within said recesses of said pair of exterior fingers of said main plate, said inwardly projecting guides for providing vertical support to distal ends of said exterior fingers of said slide plates and for sliding within said recesses of said pair of exterior fingers of said main plate.

6. The adjustable grate according to claim 5 wherein an end portion of said exterior fingers extending on said front side of said main plate define a stop that defines a limit for extension of said front slide plate with respect to said main plate.

7. The adjustable grate according to claim 5 wherein an end portion of said exterior fingers extending on said rear side of said main plate define a stop that defines a limit for extension of said rear slide plate with respect to said main plate.

* * * * *